Patented Apr. 18, 1944

2,347,027

UNITED STATES PATENT OFFICE 2,347,027

LEUCO SULPHURIC ACID ESTERS OF THE ANTHRAQUINONE SERIES

Eduard Besler, Frankfort-on-the-Main, Germany, assignor to General Aniline & Film Corporation, New York, N. Y., a corporation of Delaware No Drawing. Application April 4, 1941, Serial No. 386,771. In Germany April 13, 1940

3 Claims. (Cl. 260—193)

The present invention relates to leuco sulphuric acid esters of the anthraquinone series and more particularly to compounds of the following general formula:

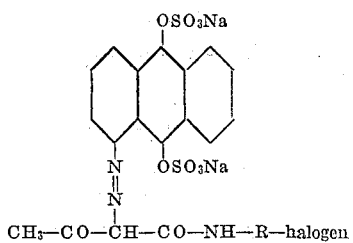

$CH_3—CO—CH—CO—NH—R—halogen$ wherein R represents a radical of the benzene or naphthalene series.

In German Patent No. 539,115, there is described the leuco sulphuric acid ester of the azo-dyestuff from diazotized alpha-amino-anthraquinone and acetoacetic acid anilide. This leuco sulphuric acid ester dissolves easily in water and yields, when dyed or printed on the fiber according to the method usual for this class of dyestuffs, a yellow shade whose fastness properties do not comply with requirements of the practice.

Now, I have found that dyestuffs of improved fastness properties are obtained by transforming into the leuco sulphuric acid esters the azo-dyestuffs obtainable from diazotized alpha-aminoanthraquinone and acetoacetic acid arylides, halogenated in the arylide radical, such as, for instance, acetoacetic acid-2-chloranilide, acetoacetic acid-3-chloranilide, acetoacetic acid-4-chloranilide, acetoacetic acid-2.5-dichloroanilide, acetoacetic acid-2.6-dichloranilide, acetoacetic acid-2.4.5-trichloranilide, acetoacetic acid-2-methoxy-5-chloranilide, acetoacetic acid-3-methoxy-6-chloranilide, acetoacetic acid-2.5-dimethoxy-4-chloranilide, acetoacetic acid-4.6-dimethoxy-3-chloranilide, acetoacetic acid-2-methoxy-4-acetylamino-5-chloranilide, acetoacetic acid-2-methoxy-4-benzoylomino-5-chloranilide, acetoacetic acid-2-methyl-4-chloranilide, acetoacetic acid-2-methyl-5-chloranilide, acetoacetic acid-3-methyl-6-chloranilide, acetoacetic acid-2-methyl-4.5-dichloranilide, acetoacetic acid-2-phenoxy-5-chloranilide, acetoacetic acid-2-methoxy-4-bromanilide, acetoacetic acid-2-methyl-5-methoxy-4-bromanilide, acetoacetic acid-2.5-diethoxy-4-bromanilide, acetoacetic acid-2.4-dimethoxy-5-bromanilide, acetoacetic acid-3-chloro-1-naphthalide, acetoacetic acid-4-chloro-1-naphthalide, acetoacetic acid-8-chloro-1-naphthalide, acetoacetic acid 4.8-dichloro-1-naphthalide, acetoacetic acid-5.8-dichloro-1-naphthalide.

In comparison with the dyeings produced with the dyestuff disclosed in the example of German Patent No. 539,115 the dyeings produced with the new compounds have, for instance, an essentially better fastness to washing on artificial silk staple fiber.

The new leuco sulphuric acid esters may be prepared in a very good yield and in a very pure state by treating the products obtained by coupling diazotized alpha-aminoanthraquinone with halogenated acetoacetic acid arylides in the presence of a tertiary base, for instance pyridine, with chlorosulphonic acid or another agent yielding sulphuric anhydride in the presence of a metal, such as copper, iron or the like. The esterification mass is advantageously worked up by introducing it into water and sodium carbonate or caustic soda solution, freeing it from the pyridine by distillation under reduced pressure and from the metal salts by filtration. From the filtrate the resultant sulphuric acid ester salts are salted out by means of sodium chloride. The precipitated sodium salts of the leuco sulphuric acid esters are filtered with suction and, after stabilization, dried under reduced pressure.

The following examples serve to illustrate the invention, but they are not intended to limit it thereto, the parts being by weight:

(1) Into the esterification mixture obtained by causing 40 parts of chlorosulphonic acid to run into 200 parts of a pyridine fraction boiling at 125°–126° C., there is introduced a mixture of 20 parts of copper powder and 20 parts of the dyestuff obtainable by coupling diazotized alpha-aminoanthraquinone with acetoacetic acid-2-chloranilide. By stirring the whole for 1 hour at 40° C., the esterification is finished. The mixture is introduced into ice-water to which 10 parts of diatomaceous earth have been added. The copper-pyridine-complex salt which separates is isolated from the supernatant liquor by decanting, stirred with 500 parts of ammonia of 10% strength, filtered with suction and distilled under reduced pressure with 1000 parts of a sodium carbonate solution of 2% strength, until it is free from pyridine. The solution of the ester is freed from the separated copper salts by filtration, and potassium chloride or sodium chloride and 25 parts of ammonia are added. The leuco sulphuric acid ester thus salted out is filtered with suction in the cold and stabilized by addition of a small quantity of sodium carbonate. It corresponds to the following formula:

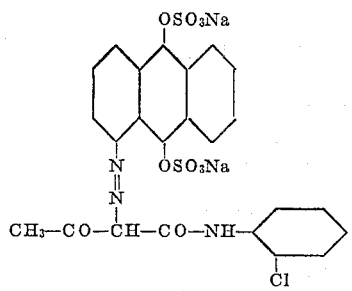

By acid oxidation the ester yields in substance as well as on the fiber a vivid yellow of very good fastness properties.

(2) By replacing the dyestuff of Example 1 by the product obtained by coupling diazotized alpha-aminoanthraquinone with acetoacetic acid-4-chloranilide, the esterification occurs in the same manner.

The leuco sulphuric acid ester obtained is easily soluble in water and yields, when printed according to the method usually applied with dyestuffs of this class, a somewhat greenish yellow print of very good fastness properties.

(3) 200 parts of chlorosulphonic acid are added, drop by drop, at 15° C.–20° C. to about 1000 parts of pyridine (fraction boiling at 125° C.–126° C.); thereupon, 100 parts of copper powder and 100 parts of the dyestuff obtainable from diazotized alpha-amino-anthraquinone and acetoacetic acid-5-c h l o r o-2-amino-1.4-dimethoxy-benzene are introduced. The mixture is stirred for 2 hours at 40° C.; the reaction mass is then introduced, while stirring, into 10000 parts of water and 50 parts of diatomaceous earth. The whole is allowed to stand for some time, until the solid matter deposits, and the mixture of pyridine and water is poured off. The remaining copper-pyridine-complex salt is washed twice with 5000 parts of water each time and then dissolved in 9000 parts of water and 240 parts of caustic soda solution of 40° Bé. by stirring for ½ hour; the separated copper salt is filtered with suction and washed. From the filtrate the leuco sulphuric acid ester is salted out by means of sodium chloride, filtered with suction and the crude ester is dissolved and re-precipitated again.

When developed on cotton in the usual manner with acid oxidizing agents, the leuco sulphuric acid ester yields a vivid orange of very good fastness properties.

(4) 150 parts of chlorosulphonic acid are caused to run, while stirring and cooling, into 800 parts of a pyridine fraction boiling at about 125° C. to about 126° C. and 100 parts of the dyestuff obtainable by coupling diazotized alpha-aminoanthraquinone with acetoacetic acid-2-chloranilide, and 60 parts of powdered iron are introduced. The reaction mass is heated for a short time to 40° C.–50° C. On account of the reaction heat, the temperature rises for a short time to 60° C. After stirring for 1 hour, the esterification mixture is poured into 4000 parts of water and 230 parts of sodium carbonate, distilled under reduced pressure until it is free from pyridine, freed from the ferruginous mud by filtration and the sulphuric acid ester is separated from the filtrate by means of about 15% of sodium chloride. The precipitated ester is filtered with suction, washed with a sodium chloride solution and made into a paste with 2% of sodium carbonate.

The leuco sulphuric acid ester is identical with that prepared according to Example 1.

(5) By replacing the dyestuff of Example 4 by the product obtained by coupling diazotized alpha-aminoanthraquinone with acetoacetic acid-4-chloranilide, a leuco sulphuric acid ester is obtained which is identical with the compound prepared according to Example 2.

(6) Into an esterification mixture of 800 parts of a pyridine fraction boiling at 125° C.–126° C. and 150 parts of chlorosulphonic acid, there are introduced 60 parts of powdered iron and 100 parts of the dyestuff obtainable by coupling diazotized alpha-aminoanthraquinone with acetoacetic acid-5-chloro-2-amino-1.4-dimethoxybenzene. The reaction mixture is heated to 40° C.–50° C. and, owing to the reaction heat, the temperature rises for a short time to 60° C. When the esterification is finished the reaction mass is introduced into 4000 parts of water and 230 parts of sodium carbonate and freed from pyridine by distillation under reduced pressure. The aqueous solution is separated from the ferruginous mud by filtration and the sulfuric acid ester formed is salted out from the filtrate by means of sodium chloride. The ester is filtered with suction and stabilized by means of sodium carbonate. It is identical with the compound described in Example 3.

By replacing the azo-dyestuffs used in the preceding examples by the products obtained by coupling diazotized alpha-amino-anthraquinone with other halogenated acetoacetic acid arylides disclosed in the description, leuco sulphuric acid esters are obtained which are easily soluble in water and yield, when dyed or printed according to the method usually applied with dyestuffs of this class, yellow to orange tints of good fastness properties.

I claim:

1. The leuco sulphuric acid esters of the anthraquinone series corresponding with the following formula:

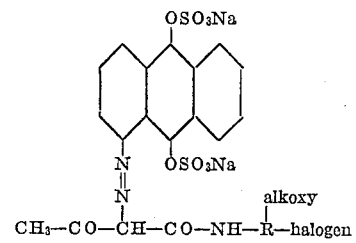

wherein R represents a member of the group consisting of radicals of the benzene and naphthalene series, being easily soluble in water and yielding by acid oxidation in substance and on the fiber yellow to orange shades of good properties of fastness.

2. The leuco sulphuric acid esters of the anthraquinone series corresponding with the following general formula:

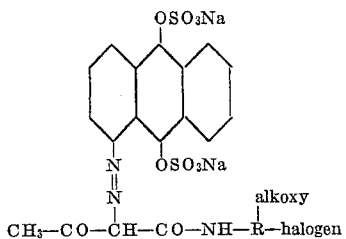

wherein R represents a radical of the benzene series, readily soluble in water and yielding by acid oxidation in substance and on the fiber yellow to orange shades of good properties of fastness.

3. The leuco sulphuric acid ester of the anthraquinone series corresponding to the following formula:

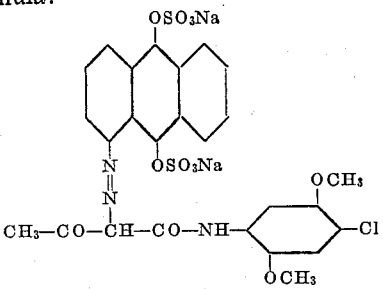

being easily soluble in water and yielding by acid oxidation in substance and on the fiber vivid orange shades of very good properties of fastness.

EDUARD BESLER.